United States Patent [19]

Adams et al.

[11] Patent Number: 5,697,594
[45] Date of Patent: Dec. 16, 1997

[54] PORTABLE DOCUMENT HOLDER FOR LAPTOP COMPUTERS

[76] Inventors: Christopher Adams, 430 E. 86th St. PH-B, New York, N.Y. 10028; Paul Adams Reaux, 320 S. Railroad Dr., Delcambre, La. 70528

[21] Appl. No.: 394,800

[22] Filed: Feb. 27, 1995

[51] Int. Cl.$^6$ .................................................. B41J 11/02
[52] U.S. Cl. .................... 248/442.2; 248/444.1; 248/918; 24/331
[58] Field of Search .................... 248/442.2, 444.1, 248/918; 24/332, 331, 338

[56] References Cited

U.S. PATENT DOCUMENTS

| | | | |
|---|---|---|---|
| 1,373,619 | 4/1921 | Kohn | 24/331 |
| 1,782,057 | 11/1930 | Bollinger | 24/332 |
| 2,006,887 | 7/1935 | Doherty | 248/442.2 |
| 4,693,443 | 9/1987 | Drain | 248/447.1 |
| 4,902,078 | 2/1990 | Judd | 312/7.2 |
| 4,934,648 | 6/1990 | Yueh | 248/442.2 |
| 4,934,853 | 6/1990 | King, III | 248/442.2 |
| 4,960,257 | 10/1990 | Waters | 248/442.2 |
| 5,044,593 | 9/1991 | Jones | 248/442.2 |
| 5,074,512 | 12/1991 | Gianforcaro et al. | 248/442.2 |
| 5,078,358 | 1/1992 | Egly et al. | 248/447.1 |
| 5,104,088 | 4/1992 | Bakanowsky | 248/442.2 |
| 5,292,099 | 3/1994 | Isham et al. | 248/442.2 |
| 5,451,025 | 9/1995 | Hames | 248/456 |

OTHER PUBLICATIONS

Double-hand holder, Radio Shack Catalog, p.114, 1995.
Adjustable Copy Clip With Line Guide, C2-Inc., 1993.

*Primary Examiner*—Leslie A. Braun
*Assistant Examiner*—Willie Berry, Jr.

[57] ABSTRACT

A portable grasping apparatus comprises a clamp and an elongated clamp or clip movably interconnected in between by means of a plurality of pivoting mechanisms. The clamp secures the apparatus to a surface, such as a portable computer, without permanently being mounted to the surface. The clamp can accommodate the varying thicknesses of portable computers of all sizes. The clip holds large shape materials such as documents, paper and the like. The apparatus serves the purpose of holding documents either to the left or right side of a user of portable computers while reading or transcribing documents during travel. In a preferred embodiment, the rotation of the clip to either side of the user is by means of a rivet as a first pivoting mechanism. The apparatus may also be folded into a compact form for storage by means of a hinge as a second pivoting mechanism. The same hinge may be used to adjust the view angle of the document. The clip, serving as a line guide during transcribing or reading of documents, is transparent and has magnifying properties. Facing the user, a clock on the front side of the clamp is an added feature for the convenience of the user.

2 Claims, 3 Drawing Sheets

PORTABLE DOCUMENT HOLDER FOR LAPTOP COMPUTERS

BACKGROUND OF THE INVENTION

This invention relates to the holding of large shapes such as paper or documents onto a portable computer for the purpose of reading or transcribing. With the invention of the portable computers such as laptops, notebooks, sub-notebooks and the like, computer users have found that these computers are now also convenient to use outside the office, especially during travel. Since word processing is one of the functions of a desktop-bound personal computer, the portable computer is thus also used for reading and transcribing documents from a medium such as paper, magazines, newspaper, office memo and the like into an electronic medium. In general, users of portable computers often lay a document down on a flat surface to read or transcribe the contents into the computer. However, in many situations, the document lying on the flat surface can slip and slide, and can be displaced from its original position by simple movements in the surrounding environment.

One prior art approach to the securing of a document adjacent to a portable computer is the use of a gripping device. However, a drawback of the device is that it must be attached to the portable computer permanently by means of double-sided adhesive tape or glue. Experience with adhesive tapes has shown that it is not a strong method of attaching a gripping device to the computer because in most cases the tape loses its adhesion, and then it falls off the computer. It can be repeatedly re-attached to the computer by adding more and more glue. But this is aesthetically displeasing and makes the portable computer problematic to store. Thus, both adhesion and permanent attachment detract from the portable nature of the computer making the computer cumbersome to travel with or store.

With the prior art device, there is no flexibility in the position and angle of viewing a document once the document is set in the device. In another words, the document must be viewed only on one side of the computer, where the device has been permanently attached. A portable computer user traveling on trains, airplanes and automobiles usually finds that the seating is small and congested, and the surrounding space allocation and availability are premium for him or her. With the prior art device, the user cannot choose the side of the computer to position the document because the prior art device is permanently fixed to one side of the computer. The prior art device is not of any use if the available side of the user turns out not to be the side where the device is mounted.

Another prior art approach to the holding of shapes and permitting flexibility and movement is a double-gripping device made of two alligator clips at two ends of a holder connected by ball joints. This arrangement permits movement and adjustment of positioning angles of the shapes held. The device is usually used in mechanical and electrical work. Small shapes are securely held by the alligator clips, but large shapes such as documents or paper cannot be efficiently held by the alligator clips.

For the desk-bound personal computer or an office machine, prior art devices are available to hold paper adjacent to the computer or machine and allow the user to view the paper on either side of the computer and adjust the angle of view. These devices by necessity are "permanently" attached to the machine, by means of double-sided adhesives, Velcro® strips, screws with mounting plates or vise-like clamping supports and the like. Although these attachment devices are removable, they either leave permanent marks on the machine or are in such large shapes as to be inconvenient to be portable for storage or traveling.

SUMMARY OF THE INVENTION

In order to overcome the problems of prior art limitations, the invention is constructed in such a manner that the document holder is not permanently attached to the portable computer. It may be used on the left or right side of the computer with equal versatility. The invention comprises of two grasping means, movably interconnected by pivoting mechanisms. In a preferred embodiment, one of the grasping means, a clamp, is used to grip to the laptop computer so that there is no permanent attachment to the computer. The clamp can be adjusted to accommodate varying thicknesses of the cover of portable computers of all sizes. Features such as ridges and a non-skid surface on the clamp permit the clamp to be fitted to the computer without slippage. The other grasping means, an elongated clamp or a clip, is used to removably hold the document or the like. With this invention, the pivoting of the clip in relationship to the clamp permits the attachment of the document holder on either side of the computer, thereby letting the user view documents either on his or her left or right side. In addition, the content of the document can be easily read through the transparent and magnifying surface of the clip, which is also used as a line marker for ease of transcription or reading. One of the pivoting mechanisms in the middle section of the document holder permits the folding of the document holder for easy storage and portability of the invention.

BRIEF DESCRIPTION OF THE DRAWING

In the drawing.

Where possible, like reference numerals have been used to indicate like elements.

DETAILED DESCRIPTION

Figure 1:
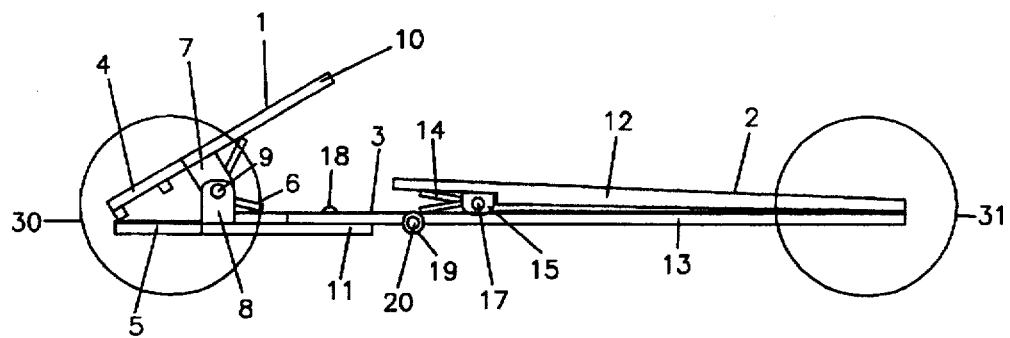
FIG. 1 is a side view of the document holder in a fully extended, horizontal position embodying the principles of the invention.
Figure 5:
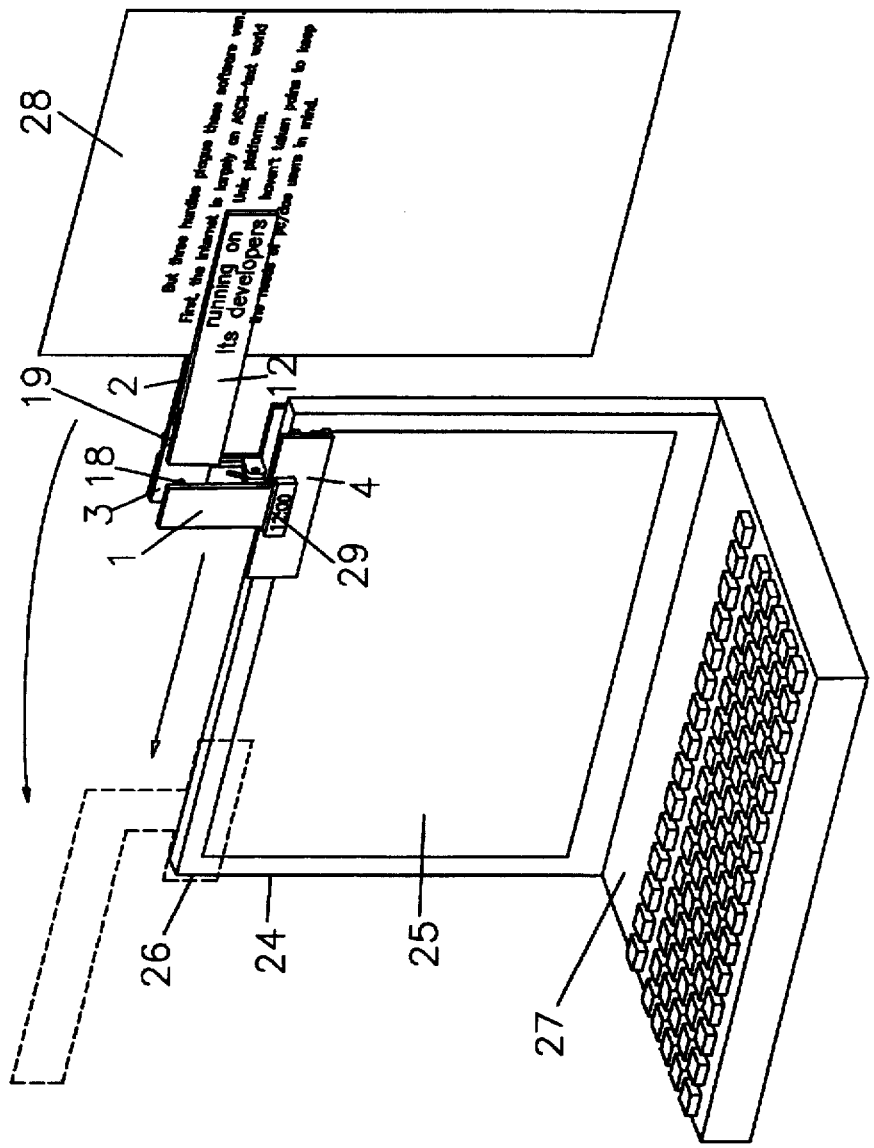
FIG. 5 is a view of the document holder in use in a preferred embodiment, displaying all features in use.

FIG. 1 illustrates a document holder embodying the principles of the invention. For general usage, large shape materials or documents can be grasped at one end for easy viewing or holding while the apparatus at the other end can be secured to a fixed surface or can be used for holding other large shapes. In a preferred embodiment as seen in FIG. 5, the apparatus may be employed by anyone as an accessory for a portable computer such as a laptop, notebook or sub-notebook or the like. One end of the apparatus holds a document 28, and the other end is clamped onto a cover 24 of a portable computer 27.

As shown in FIG. 1, the document holder is extended fully to illustrate a clamp 1, an elongated clamp or a clip 2 and a connector plate 3. The clamp 1 has two jaw elements 4, 5 of equal lengths, which are used to secure the invention onto the cover of a portable computer. The two jaws 4, 5 of the clamp are held together by a spring 6. The spring 6 can be constructed from any number of types such a ball spring, a metal strip, a coiled spring, a torsion spring and the like. In a preferred embodiment of the clamp 1, a torsion spring 6 is held to the two jaws 4, 5 by two clevises 7, 8 and a first pin 9. The jaws 4, 5 of the clamp 1 are opened by the squeezing of the pinching sections 10, 11 of the clamp 1. The clamp 1 can be constructed from any material such as plastic, metal or wood. For the purpose of portability, it should be made of a lightweight but sturdy material, in which case plastic is preferred.

The elongated clamp or clip 2 is used to removably hold documents. A clamp of any size, shape and material can be used. However, for the purpose of securing documents, a preferred embodiment of the clamp is in the shape of a elongated clamp-like clip of plastic preferred embodiment of the clamp is in the shape of a elongated clamp-like clip of plastic material for the preferred lightweight and sturdy qualities. As shown in FIG. 1, the clip 2 is comprised of two arms 12, 13. The arms 12, 13 are held together in the preferred embodiment by a second torsion spring 14, which is secured to the arms 12, 13 by a third clevis 15, and a second pin 17. The squeezing of the end sections of the arms 12, 13 proximal the spring 14 open the arms 12, 13 of the clip 2.

In FIG. 1, the clamp 1 is attached to the clip 2 by a connector plate 3. At the clamp end, the connector plate 3 is pivoted firstly by a means of a rivet 18 at the edge of the pincher section 11 of the clamp 1. At the clip end, the connector plate 3 is pivoted secondly to the arm 13 of the clip 2 at the end proximal to the spring 14 by means of a hinge 19 and a third pin 20. The functions of the two pivoting mechanisms by means of the hinge 19 and the rivet 18 will be described subsequently in FIG. 4 and 5. The connector plate 3 can be made of any material as long as it satisfies the same qualifications for lightness of weight and sturdiness. The same material for the clamp 1 and the clip 2 may be used for the connector plate 3 for an aesthetically uniform appearance.

Figure 2:
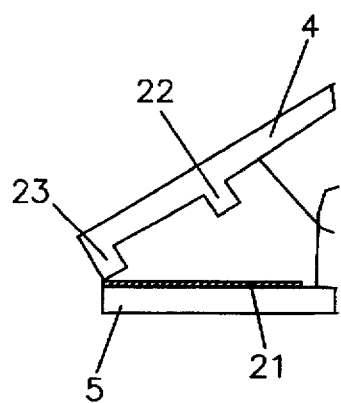
FIG. 2 is an enlargement of the clamp section of the document holder from circle 30 of FIG. 1.

FIG. 2 illustrates an enlarged view of the grasping end of the clamp 1 of FIG. 1, showing the jaws 4, 5. In a preferred embodiment as a grasping means to a surface such as a portable computer, jaw 4 of the clamp 1 is the front side of the clamp, and faces the computer user. Jaw 5 is the back side of the clamp, which rests on the back side of the portable computer when the cover of the computer is opened up for use (details in FIG. 5). As shown in FIG. 2, the interior side of the jaw 5 is lined with a non-skid material 21 in order to securely grasp the cover of the portable computer and thus prevent slippage of the document holder. A preferred embodiment of the non-skid material 21 is resilient plastic. Anyone skilled in the art will know how to attach the non-skid material 21 to the clamp 1, for example, by adhesives. The interior side of jaw 4 has two ridges 22, 23 along the longitudinal axis of the jaw 4. The ridge 22 is positioned in the middle of the jaw 4, and the ridge 23 is positioned at the clamping edge of jaw 4. The utilitarian features of the ridges will be described in further detail in FIG. 5.

Figure 3:
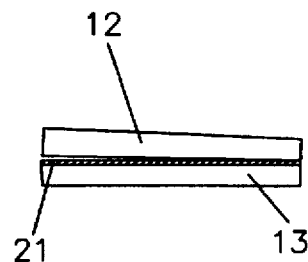
FIG. 3 is an enlargement of the clip section of the document holder from circle 31 of FIG. 1.

FIG. 3 illustrates an enlarged view of the grasping end of the clip 2 of FIG. 1, showing the arms 12, 13. Facing the computer user, the arm 12 is the front side of the clip, and the arm 13 is the back side of the clip. As shown in FIG. 3, in the preferred embodiment as a grasping means for documents and the like, the interior side of arm 13 of the clip 2 is also lined with the non-skid material 21 to securely grasp the document without slippage.

Figure 4:
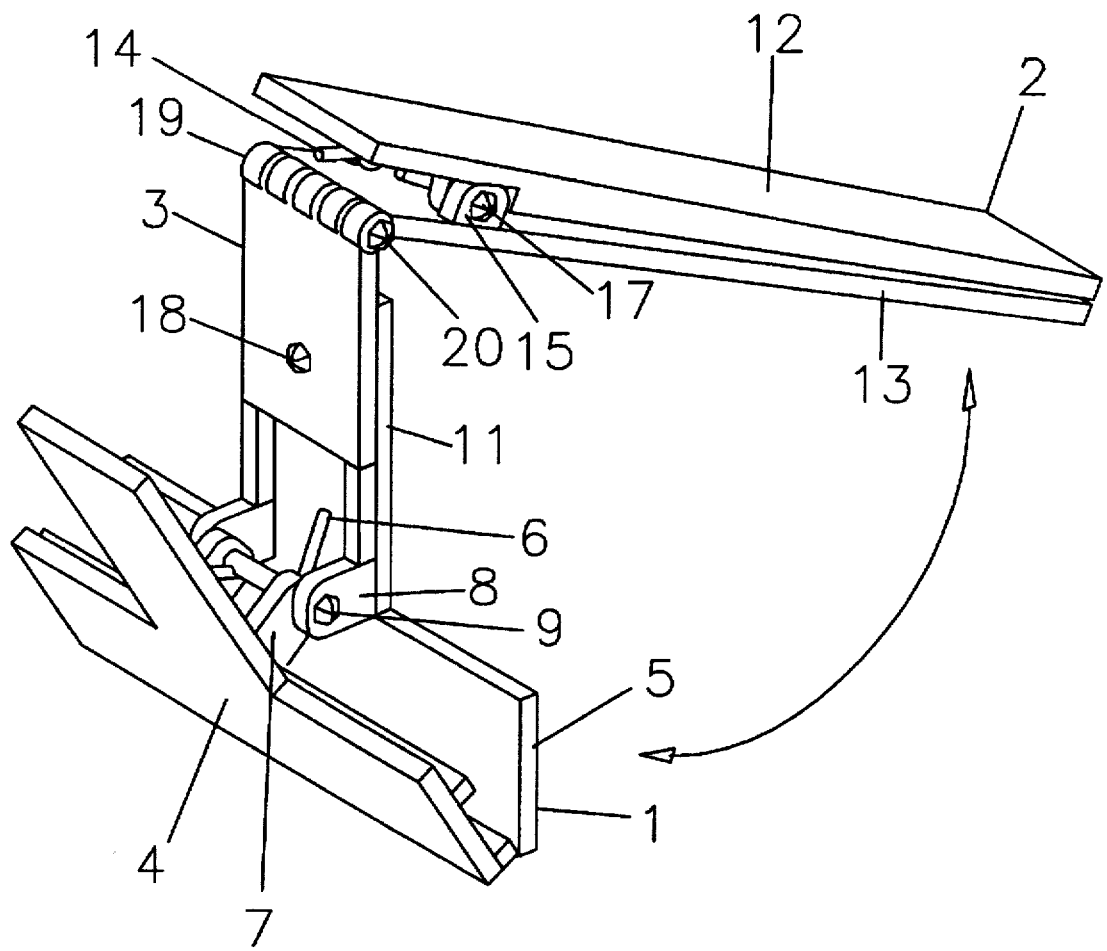
FIG. 4 is a side view of a preferred embodiment of the document holder in a folded position.

FIG. 4 illustrates the document holder in a folding position when not in use. For the purpose of clarity, the non-skid material 21 is not shown. In between the clamp 1, the connector plate 3 and the clip 2 is the hinge 19. A preferred embodiment for the hinge 19 is a hinge that is built into the arm 13 and the connector plate 3, with interconnecting units which are secured by the pin 20. This hinge 19 is the second pivoting mechanism. Plastic is preferred for the hinge because the hinge element can be molded as a single piece together with the rest of the grasping means. An alternate hinge can be metal, attaching the connector plate 3 to the arm 13 of the clip 2. Anyone skilled in the art can readily make a hinge that connects two planar surfaces and permits swinging movement between the two planar surfaces up to an angle of 180°. This second pivoting mechanism permits the swinging motion of the clamp 1 and the clip 2 along an axis perpendicular to the fully extended position of the apparatus of FIG. 1, at hinge 19, in other words, as shown in FIG. 4, the clamp 1 and the clip 2 swing towards each other along the directional arrows. Therefore, the document holder can be folded from the fully extended position of FIG. 1 into a compact shape for storage, with clip 2 laying flat against clamp 1, after clip 2 has been collapsed at the directional arrow in FIG. 4 and pushed toward clamp 1. This portable document holder can then be readily tucked into a brief case or a laptop computer carrying case during travel.

During use, the document holder must first be swung outward at the hinge 19 of the connector plate 3 so that the clamp 1 and the clip 2 are in alignment, in the fully extended position as illustrated in FIG. 1.

FIG. 5 illustrates the use of the document holder as applied to a portable computer. In FIG. 5, the clip 2 is shown to be holding a document or piece of paper 28. The non-skid material 21 lining the interior side of arm 13 of the clip 2 as shown in FIG. 2, secures the paper 28 and the like and prevents paper slippage from the clip 2. As shown in FIG. 5, the interior of a portable computer 27, which faces the user, is illustrated. When the portable computer 27 is in use, a cover 24, which houses a screen 25, is opened. For most portable computers, the cover 24 has an extended lip 26, which may protrude out towards the computer user. When the clamp 1 of the apparatus is mounted onto the cover 24 of the portable computer 27, the ridges 22, 23 of FIG. 2 fit underneath the extended lip 26 of the cover 24, in the interior of the portable computer 27. This prevents the document holder from toppling over as a result of the imbalance in weight contributed by the paper or document 28 at the clip 2 section. The clevises 7, 8 of the clamp 1 of FIG. 1 should be made no less than 2 to 3 centimeters in length so that the jaws 4, 5 can be squeezed open wide enough to fit the varying thicknesses of different covers of portable computers of all sizes. The non-skid material 21 lining the interior side of jaw 5 of the clamp 1 of FIG. 2 prevents slippage of the document holder off the computer.

As shown in FIG. 5, the first pivoting mechanism of the clip 2 by means of the rivet 18 permits the clip 2 to rotate 90° along an axis of the fully extended apparatus of FIG. 1. In other words, as illustrated in FIG. 5, the clip 2 has been rotated from the fully extended position to the right side of the computer user so that the document holder can be positioned on the right side of the computer. Similarly, the pivoting action of the rivet 18 permits clip 2 to rotate 90° from the fully extended position to the left side of the user so that the document holder is now at the left side of the user, and the clamp 1 can now be positioned on the left side of the computer, as shown by the directional arrows and the phantom lines. The second pivoting mechanism by means of the hinge 19 also permits the user to adjust the clip 2 to any angle for easy viewing of the document. Once the clip 2 is swung to an angle, the position remains set.

In another embodiment, the document holder has only one pivoting mechanism, the rivet 18. In such a case, the document holder can still be rotated to either side of the user, and be secured to the cover 24 of the portable computer 27 on either side. However, the document holder cannot be able to be folded into a compact state as shown in FIG. 4, nor can the angle of viewing the document be adjusted.

As illustrated in FIG. 5, in a preferred embodiment, the arm 12 of the clip 2 is made of a transparent plastic material with magnifying properties so that the content of the paper or document 28 can be enlarged for easy reading. Anyone skilled in the art can readily make arm 12 into a magnifier with convex lens or Fresnel lens. The transparent arm 12 serves also as a line guide for easy transcribing or reading.

Another embodiment for the convenience of the user is the installation of a small digital timing device such as a clock 29 on the exterior side of the jaw 4 of the clamp 1. This exterior side of the jaw 4 is the front side of clamp 1, facing the user. The clock may be solar-powered.

While the invention has been described and illustrated with respect to particular embodiments, this is not intended to be limiting. The scope of the invention is defined by the claims below. Those skilled in the art will have no difficulty devising obvious modifications and variations, which all fall within the invention as defined by the claims.

I claim:

1. An apparatus comprising a clamp having two jaws squeezed together by a first spring means;

an elongated clip having two arms squeezed together by a second spring means, wherein one of the arms of the clip is transparent, wherein the transparent arm comprises a magnifying lens, and wherein the lens is of constant cross section for part of its length, forming a cylindrical section; and at least one pivot movably connecting the clamp and the clip.

2. An apparatus comprising;

a clamp having two jaws squeezed together by a first spring means, and further comprising a clock mounted to the clamp;

an elongated clip having two arms squeezed together by a second spring means;

at least one pivot movably connecting the clamp and the clip.

* * * * *